W. C. STEVENS.

WRAPPING MACHINE FOLDER.

APPLICATION FILED MAR 8, 1920.

Reissued May 3, 1921. 15,099.

WITNESSES

Rudolph T. Berg

Charles W. Helsgr

INVENTOR

WILLIAM C. STEVENS.

BY Charles E. Nieles

ATTY.

UNITED STATES PATENT OFFICE.

WILLIAM C. STEVENS, OF AKRON, OHIO, ASSIGNOR TO PIERCE WRAPPING MACHINE COMPANY, A CORPORATION OF ILLINOIS.

WRAPPING-MACHINE FOLDER.

15,099. Specification of Reissued Letters Patent. Reissued May 3, 1921.

Original application filed August 19, 1912, Serial No. 715,745. Patent No. 1,196,044, dated August 29, 1916. Divided and application filed July 1, 1916, Serial No. 107,080. Original No. 1,243,357, dated October 16, 1917. Application for reissue filed March 8, 1920. Serial No. 364,246.

*To all whom it may concern:*

Be it known that I, WILLIAM C. STEVENS, a citizen of the United States, and a resident of the city of Akron, in the county of Summit and State of Ohio, have invented certain new and useful Improvements in Wrapping-Machine Folders; and I do hereby declare that the following is a full, clear, and exact description of the same, reference being had to the accompanying drawings, and to the numerals of reference marked thereon, which form a part of this specification.

This invention constitutes a divisional application of my patent for wrapping machine, issued August 29th, 1916, No. 1,196,044. The folder device forming the subject matter of the invention is used upon a high speed revolving shuttle which forms a part of a wrapping machine for applying a spiral wrapping or winding or covering strip such as paper about annular bodies for example automobile tires, coiled wire, and the like, or upon long cylindrical bodies such as pipe, rods, or other objects capable of receiving such a wrapping.

It is an object of this invention to construct a folding device used in combination with a creasing roller which acts to crease the strip of paper drawn through the folder, creasing the same as it is led around said roller, the roller of course permitting the strip to leave the shuttle for application to the article at any angle for different relative positions of the shuttle and the article without requiring readjustment of the parts.

It is also an object of this invention to construct a folder device which is pivotally mounted adjacent a creasing roller adapting the paper wrapping to be drawn through the folder device and creased upon the roller and then led to the article to be wrapped.

It is furthermore an object of this invention to construct an improved form of folder device which co-acts with a spring plate to afford a tension mechanism for the paper drawn through the folder before being folded.

It is finally an important object of this invention to construct a device simple in construction and operating efficiently to perform the purpose for which it is designed.

The invention (in a preferred form) is illustrated in the drawings and hereinafter more fully described.

On the drawings—

Figure 1:
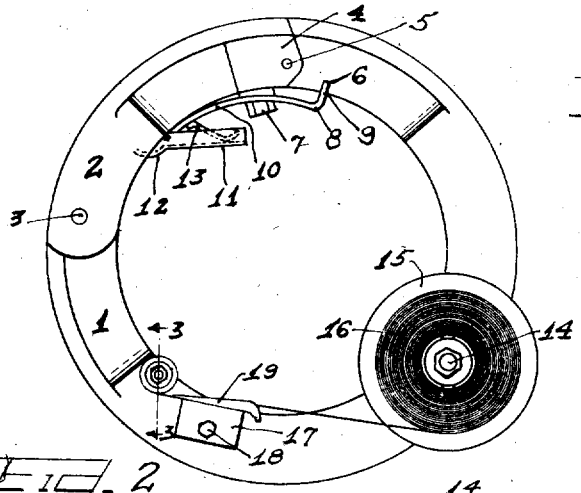
Figure 1 is a front elevation of a shuttle equipped with a folder device embodying the principles of my invention.

The main section of the shuttle, which is a closed ring when in condition for operation, is denoted as a whole by the reference numeral 1, and hinged thereto is a section 2 to permit opening of the shuttle for insertion or removal of the article to be wrapped. Said hinged section 2 is pivotally engaged at one end on the end of the shuttle member 1 by means of a pin 3 and at the other end is provided with projections 4 on both sides thereof forming a yoke adapted to receive therein a tongue member integral with the end of the shuttle section 1. A pin 5 extends transversely through said projections 4 and is adapted to hold the ends of the shuttle sections engaged with one another, thus insuring a true periphery for the shuttle under all conditions when the hinged section is closed.

Means are provided for locking said hinged section in closed position. For this purpose a notch 6 is provided in the shuttle 1 on the inner periphery thereof, and pivotally supported by means of a bolt 7 extending radially from the inner side into said hinged section 2 of the shuttle is a swinging detent 8 having a finger 9 adapted to engage in said notch. The elongated tail 10 of said detent lever extends around the inner periphery of said hinged section and pivotally mounted on said section is a lever 11, one end 12 thereof engaging in a suitable notch or recess in said hinged section. As shown, a spring 13 is mounted between said detent lever and lever 11 and engages the free end of said lever 11, acting to hold the same normally in locking position, as clearly shown in Fig. 1. When it is desired to release the hinged section, the tail of the lever is pressed downwardly toward the tail 10 of the detent lever, thus releasing the locking end of said detent lever, whereupon the same may be swung laterally carrying the finger 9 thereon out of the notch 6 and permitting the shuttle to be opened. Mounted on the face of the shuttle diametrically opposite the hinged section thereof is a stud shaft 14 upon which a paper reel 15 is mounted, carrying a reel of wrapping material 16.

Figure 3:
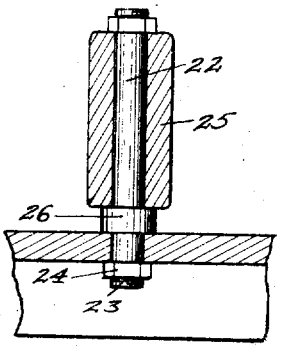
Fig. 3 is a detail section taken on line 3—3 of Fig. 1.
Figure 2:
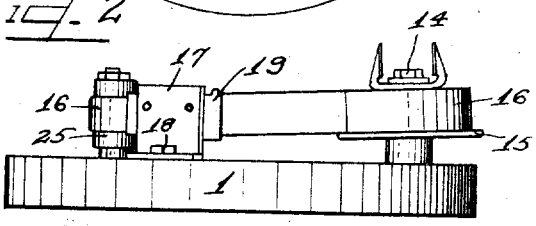
Fig. 2 is a bottom plan view thereof.

An angled bracket plate 17 is pivotally and obliquely secured upon the face of the shuttle by means of a bolt 18, and secured on said plate is a folding device 19 consisting of a sheet of metal bent to afford a tapering nozzle 20 comprising an inner and relatively narrow plate or member, an outer wider plate or member, and a lip 21 integral with the outer fold and turned over the inner plate or member. The opposite end of said nozzle is wider and flaring to receive the paper or other material therein. Said folding device is secured on said bracket plate 17, in any suitable manner with the tapered end of the nozzle directed outwardly. Mounted adjacent said tapered end of the folding device and set in the face of the shuttle is a stud shaft 22 which is inclined slightly as shown in Fig. 3. The lower end 23 of said stud shaft engages perpendicularly through the wall or face of the shuttle, and a nut 24 is provided thereon which may be loosened to permit an adjustment of the upper angled portion 22 into any desired position. Journaled on said stud shaft 22 is a creasing roller 25 or if preferred, the stud shaft may be merely rounded or provided with a convex surface over which the paper or other wrapping material may be drawn to the article to be wrapped. A washer 26 the opposite surfaces of which are inclined conforming to the angularity of the portions 22 and 23 of the stud shaft is engaged upon said stud shaft between said roller 25 and the face of the shuttle.

Figure 4:
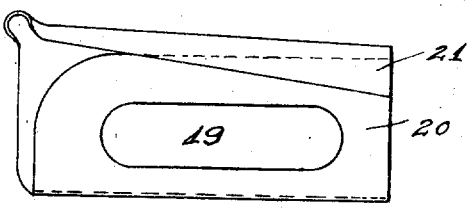
Fig. 4 is a detail view of the folder device shown detached from the shuttle.
Figure 5:
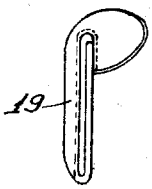
Fig. 5 is a view of the entrance end thereof.

The operation is as follows:

The paper or other wrapping material is drawn from the reel through the folding nozzle 19 around the guide roll 25 and thence to the article, and when the shuttle is rotated, of course, the wrapping material is applied to the article. The pivotal mounting of the folding nozzle 19 by means of the bolt 18 on the face of the shuttle, permits the nozzle to properly aline itself between the roller 25 and the periphery of the constantly decreasing reel of paper 16. As clearly shown in Fig. 4, at the entrance end of the folder nozzle, the inner fold plate over which the lip 21 extends is rounded at its end beneath the flaring end of the upper fold of the plate, so that an easy entrance for the wrapping material is provided. The roller 25 may be adjusted into various positions by loosening the nut 24 so that the proper operating position of the roller 25 with respect to the article being wrapped may be easily secured.

It may be found desirable at times after adjusting the nozzle 19 properly to feed the wrapping material, to clamp the same in adjusted position, which readily may be accomplished by tightening the bolt 18, as shown in the drawings.

I am aware that various details of construction may be varied through a wide range without departing from the principles of this invention, and I therefore do not purpose limiting the patent granted otherwise than necessitated by the prior art.

I claim as my invention—

1. In a device of the class described, paper-supporting means, folding mechanism to fold the paper led from said means and a creasing member to crease the fold in the paper, said folder mechanism so constructed as to automatically aline itself into proper position between said means and member as the direction of feed of said paper changes with a decrease in the supply thereof.

2. In a device of the class described, the combination with paper-supporting mechanism of a folding device for said paper mounted to automatically adjust itself to said mechanism as the direction of feed of the paper to said device varies.

3. In a device of the class described, means for supporting a roll of paper thereon, a roller adapted to have the paper drawn thereover, and a folding device adapted to automatically aline itself to compensate for the varying diameter of the roll of paper as it is unwound.

4. In a device of the class described, an angularly inclined means for carrying a roll of paper, a creasing roller having an angular inclination complemental therewith, and an automatically alining folding device through which the paper passes from the roll to the creasing roller.

5. In a wrapping machine of the class described, an angularly inclined creasing roller, an angularly inclined shaft for carrying a roll of paper, and a pivotally mounted folder between said roller and shaft adapted to automatically position itself to compensate for the varying diameter of the roll of paper during the wrapping operation.

6. In a device of the class described, the combination with paper-supporting mechanism, of a folding device for said paper mounted to automatically adjust itself to said mechanism as the direction of feed of the paper to said device varies, said device being adapted when desired to be clamped in any adjusted position.

In testimony whereof, I have hereunto subscribed my name.

WILLIAM C. STEVENS.